United States Patent
Ang et al.

(10) Patent No.: US 7,170,249 B2
(45) Date of Patent: Jan. 30, 2007

(54) ELECTRICAL PHASE COMPENSATION IN BEMF SPINDLE MOTOR CONTROL

(75) Inventors: June Christian Ang, Singapore (SG); KianKeong Ooi, Singapore (SG); WingKong Chiang, Singapore (SG); MingZhong Ding, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/312,052

(22) Filed: Dec. 20, 2005

(65) Prior Publication Data

US 2006/0097681 A1    May 11, 2006

Related U.S. Application Data

(63) Continuation-in-part of application No. 10/456,607, filed on Jun. 6, 2003, now abandoned.

(51) Int. Cl.
*G05B 11/01* (2006.01)
*G11B 7/00* (2006.01)

(52) U.S. Cl. .............. 318/560; 318/561; 318/608; 318/632; 369/47; 369/48

(58) Field of Classification Search ............. 318/560, 318/630, 632, 254, 245, 439
See application file for complete search history.

(56) References Cited

U.S. PATENT DOCUMENTS

| | | | | |
|---|---|---|---|---|
| 2,797,378 A | * | 6/1957 | Johnson | 318/806 |
| 3,541,416 A | | 11/1970 | Woyton | 318/331 |
| 3,970,897 A | | 7/1976 | Tamir et al. | 361/23 |
| 3,973,897 A | * | 8/1976 | Berggren et al. | 425/526 |
| 4,193,020 A | * | 3/1980 | Song | 388/812 |
| 4,300,081 A | | 11/1981 | Van Landingham | 318/599 |
| 4,873,619 A | * | 10/1989 | Neupauer | 363/51 |
| 4,912,378 A | * | 3/1990 | Vukosavic | 318/254 |
| 5,334,917 A | * | 8/1994 | Lind | 318/254 |
| 5,343,127 A | | 8/1994 | Maiocchi | 318/254 |

(Continued)

FOREIGN PATENT DOCUMENTS

JP    06138948 A    5/1994

(Continued)

*Primary Examiner*—Paul Ip
(74) *Attorney, Agent, or Firm*—Westman, Champlin & Kelly (57) ABSTRACT

A method and apparatus for compensating for the asymmetrical phases of a spindle motor in a disc drive are provided. With the apparatus and method, compensation values are learned by sampling speed data during a period of operation of the disc drive where the speed is stable and only one control operation is performed per revolution of the disc. The sampled speed data is used to generate the compensation values for each of the phases of the spindle motor. The compensation values are stored in a compensation mechanism which is used by the spindle motor speed controller to provide compensation for the asymmetrical phases of the spindle motor. During Normal operation, the actual speed output of the spindle motor is measured and is subtracted from a reference speed to generate a difference speed value. Based on the corresponding electrical phase, the correct compensation value is fetched and is subtracted from the difference speed value to obtain a compensated difference speed value. A control signal based on this compensated difference speed value is generated and provided to the spindle motor to thereby control the output speed of the spindle motor.

20 Claims, 5 Drawing Sheets

U.S. PATENT DOCUMENTS

| | | | |
|---|---|---|---|
| 5,442,266 A | 8/1995 | Morehouse et al. | 318/272 |
| 5,504,402 A | 4/1996 | Menegoli | 318/377 |
| 5,508,983 A | 4/1996 | Nakamura et al. | 369/47.31 |
| 5,530,326 A | 6/1996 | Galvin et al. | 318/254 |
| 5,576,906 A | 11/1996 | Fisher et al. | 360/77.08 |
| 5,619,081 A * | 4/1997 | Gershen et al. | 307/125 |
| 5,627,742 A | 5/1997 | Nakata et al. | 363/98 |
| 5,636,912 A | 6/1997 | Lee et al. | 353/46 |
| 5,694,380 A | 12/1997 | Shimizume et al. | 369/47.45 |
| 5,838,128 A | 11/1998 | Maiocchi et al. | 318/439 |
| 5,854,519 A * | 12/1998 | Gershen et al. | 307/125 |
| 5,874,817 A | 2/1999 | Yashita et al. | 318/439 |
| 5,982,571 A | 11/1999 | Calfee et al. | 360/70 |
| 5,990,656 A | 11/1999 | Kardash | 318/807 |
| 6,014,002 A * | 1/2000 | Guinet | 318/701 |
| 6,094,022 A | 7/2000 | Schillaci et al. | 318/254 |
| 6,100,656 A | 8/2000 | Ed-Sadi et al. | 318/254 |
| 6,104,153 A | 8/2000 | Codilian et al. | 318/362 |
| 6,153,989 A | 11/2000 | Kardash et al. | 318/254 |
| 6,157,153 A | 12/2000 | Uegami et al. | 318/364 |
| 6,163,118 A * | 12/2000 | Chen et al. | 318/254 |
| 6,198,590 B1 | 3/2001 | Codilian et al. | 360/73.03 |
| 6,326,750 B1 | 12/2001 | Marcinkiewicz | 318/432 |
| 6,326,758 B1 * | 12/2001 | Discenzo | 318/609 |
| 6,363,214 B1 | 3/2002 | Merello et al. | 388/928.1 |
| 6,463,211 B1 | 10/2002 | Peritore et al. | 388/928.1 |
| 6,534,938 B1 | 3/2003 | Wu et al. | 318/254 |
| 6,646,397 B1 * | 11/2003 | Discenzo | 318/439 |
| 6,710,495 B2 * | 3/2004 | Lipo et al. | 310/184 |
| 6,785,080 B1 * | 8/2004 | Sun et al. | 360/75 |
| 2002/0121870 A1 | 9/2002 | Inoue et al. | 318/114 |
| 2002/0167287 A1 | 11/2002 | Heydt et al. | 318/254 |
| 2004/0012355 A1 | 1/2004 | Sosseh et al. | 318/439 |
| 2004/0036436 A1 | 2/2004 | Tieu | 318/439 |
| 2004/0245950 A1* | 12/2004 | Ang et al. | 318/268 |
| 2004/0251861 A1 | 12/2004 | Tieu | 318/276 |
| 2005/0125114 A1* | 6/2005 | Atmur | 701/22 |

FOREIGN PATENT DOCUMENTS

JP        2003153582 A        5/2003

* cited by examiner

ELECTRICAL PHASE COMPENSATION IN BEMF SPINDLE MOTOR CONTROL

CROSS-REFERENCE TO RELATED APPLICATION

This application claims the benefit of and is a Continuation-in-Part of U.S. application Ser. No. 10/456,607, filed Jun. 6, 2003 now abandoned, and entitled ELECTRICAL PHASE COMPENSATION IN BEMF SPINDLE MOTOR CONTROL, which is hereby incorporated by reference in its entirety.

FIELD OF THE INVENTION

The present invention relates generally to the field of spindle motor control in disc drives. More particularly, the present invention relates to an apparatus and method for compensating for asymmetrical electrical phases in the spindle motor so that a uniform operation of the spindle motor with regard to speed of rotation of the disc in the disc drive is achieved.

BACKGROUND OF THE INVENTION

Disc drives are commonly used in workstations, personal computers, laptops and other computer systems to store large amounts of data in a form that can be made readily available to a user. In general, a disc drive comprises a magnetic disc that is rotated by a spindle motor. The surface of the disc is divided into a series of data tracks. The data tracks are spaced radially from one another across a band having an inner diameter and an outer diameter.

Each of the data tracks extends generally circumferentially around the disc and can store data in the form of magnetic transitions within the radial extent of the track on the disc surface. An interactive element, such as a magnetic transducer, is used to sense the magnetic transitions to read data, or to transmit an electric signal that causes a magnetic transition on the disc surface, to write data. The magnetic transducer includes a read/write gap that contains the active elements of the transducer at a position suitable for interaction with the magnetic surface of the disc. The radial dimension of the gap fits within the radial extent of the data track containing the transitions so that only transitions of the single track are transduced by the interactive element when the interactive element is properly centered over the respective data track.

The magnetic transducer is mounted by a head structure to a rotary actuator arm and is selectively positioned by the actuator arm over a preselected data track of the disc to either read data from or write data to the preselected data track of the disc, as the disc rotates below the transducer. The actuator arm is, in turn, mounted to a voice coil motor that can be controlled to move the actuator arm across the disc surface.

A servo system is typically used to control the position of the actuator arm to insure that the head is properly centered over the magnetic transitions during either a read or write operation. In a known servo system, servo position information is recorded on the disc surface between written data blocks, and periodically read by the head for use in a closed loop control of the voice coil motor to position the actuator arm. Such a servo arrangement is referred to as an embedded servo system.

In modern disc drive architectures utilizing an embedded servo, each data track is divided into a number of data sectors for storing fixed sized data blocks, one per sector. Associated with the data sectors are a series of servo sectors, generally equally spaced around the circumference of the data track. The servo sectors can be arranged between data sectors or arranged independently of the data sectors such that the servo sectors split data fields of the data sectors.

Each servo sector contains magnetic transitions that are arranged relative to a track centerline such that signals derived from the transitions can be used to determine head position. For example, the servo information can comprise two separate bursts of magnetic transitions, one recorded on one side of the track centerline and the other recorded on the opposite side of the track centerline. Whenever a head is over a servo sector, the head reads each of the servo bursts and the signals resulting from the transduction of the bursts are transmitted to, e.g., a microprocessor within the disc drive for processing.

When the head is properly positioned over a track centerline, the head will straddle the two bursts, and the strength of the combined signals transduced from the burst on one side of the track centerline will equal the strength of the combined signals transduced from the burst on the other side of the track centerline. The microprocessor can be used to subtract one burst value from the other each time a servo sector is read by the head. When the result is zero, the microprocessor will know that the two signals are equal, indicating that the head is properly positioned.

If the result is other than zero, then one signal is stronger than the other, indicating that the head is displaced from the track centerline and overlying one of the bursts more than the other. The magnitude and sign of the subtraction result can be used by the microprocessor to determine the direction and distance the head is displaced from the track centerline, and generate a control signal to move the actuator back towards the centerline.

Each servo sector also contains encoded information to uniquely identify the specific track location of the head. For example, each track can be assigned a unique number, which is encoded using a Gray code and recorded in each servo sector of the track. The Gray code information is used in conjunction with the servo bursts to control movement of the actuator arm when the arm is moving the head in a seek operation from a current track to a destination track containing a data field to be read or written.

The head structure also includes a slider having an air bearing surface that causes the transducer to fly above the data tracks of the disc surface due to fluid currents caused by rotation of the disc. Thus, the transducer does not physically contact the disc surface during normal operation of the disc drive to minimize wear at both the head and disc surface. The amount of distance that the transducer flies above the disc surface is referred to as the "fly height." By maintaining the fly height of the head at an even level regardless of the radial position of the head, it is ensured that the interaction of the head and magnetic charge stored on the media will be consistent across the disc. The discs of the disc drive are mounted for rotation by a spindle motor arrangement, as is generally known in the art. The spindle motor arrangement rotates the discs of the disc drive in accordance with a drive voltage received from a spindle motor control unit. A spindle motor driver typically drives the spindle motor. A typical three-phase spindle motor includes a stator having three windings and a rotor. The rotor has magnets that provide a permanent magnet field. The spindle motor generates torque on the rotor when current flows through at least one of the windings. The torque depends upon the magnitude and direction of current flow through the windings and an angular position of the rotor relative to the stator. The functional relationship between torque and current flow and angular position is commonly depicted in a set of torque curves, each of which corresponds to a respective one of a set of commutation states.

A spindle motor control unit is responsive to control signals received from the microprocessor to generate and transmit the drive voltage to the spindle motor to cause the storage discs to rotate at an appropriate rotational velocity. Traditionally, spindle velocity control makes use of servo wedges, or address mark-to-address mark (AM-to-AM) timing to measure the velocity of the motor. Such an approach is very accurate with regard to single disc packwriter technologies, i.e. devices which write servo patterns onto discs one disc at the time, since servo patterns are written to the discs at a high resolution, such as around 5 ns or less. However, there has been a recent technology transition to multiple disc writer (MDW) technology in which discs are pre-written with servo patterns using MDW machines before they are attached to the disc array.

Figure 1:
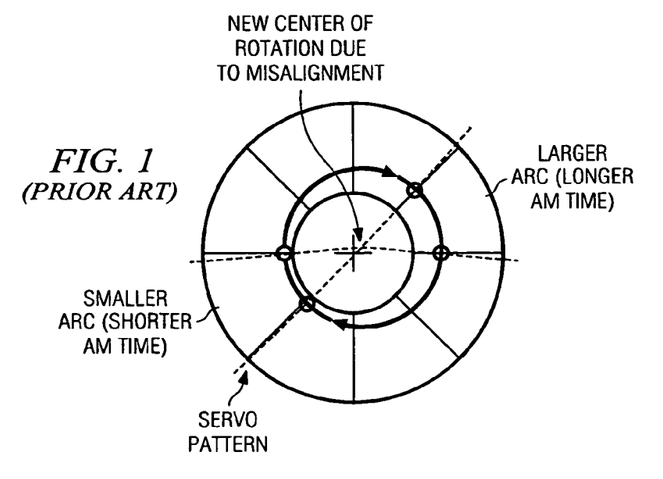
FIG. 1 is an exemplary diagram illustrating the problem associated with misalignment of discs in a disc drive with regard to AM-to-AM timing.

A problem arises with MDW discs in that the discs may be misaligned during installation into the disc array. As a result, the AM-to-AM timing may be different from one sector of the disc to another, as illustrated in FIG. 1. As shown in FIG. 1, there may be a larger arc in one sector of the disc than another sector of the disc due to an offset in the center of rotation which is the result of a misalignment of the disc. Since the AM-to-AM timing is used to measure the velocity of the disc, such a misalignment will cause errors in the measuring and control of the velocity of the disc generated by the spindle motor.

In order to provide a solution to the above problem, two approaches have generally been taken. The first approach is to construct a polynomial function that resembles the AM-to-AM timing variation in the disc using a least squares error fit method. This method requires the collection and storage of AM timings on several tracks and a number of computations to determine the coefficients of the polynomial.

The second approach is to make use of the Back Electromotive Force (BEMF) zero crossings of the spindle motor to determine the velocity of the discs. This approach is simpler and faster than the first approach since there is no reliance or dependency on information being read from the discs, i.e. long seeks are not a problem with this approach. Thus, the BEMF zero crossings approach has started to receive more interest for use in measuring and controlling the velocity of spindle motors.

However, there are factors that may cause the BEMF zero crossings approach to be inaccurate for controlling the velocity of discs in the disc drive. One such factor is the asymmetrical electrical phases of the spindle motor. This asymmetrical electrical phase of the spindle motor causes a repeatable error in the detection of BEMF zero crossings and thus, an error in the control of the velocity of the discs in the disc drive. Accordingly, it would be beneficial to have a mechanism for compensating for the errors introduced by the asymmetrical electrical phase of the spindle motor in the detection of BEMF zero crossings for controlling the velocity generated by the spindle motor. The present invention provides a solution to this and other problems, and offers other advantages over previous solution

SUMMARY OF THE INVENTION

The present invention provides a method and apparatus for compensating for the asymmetrical phases of a spindle motor in a disc drive. With the present invention, compensation values are learned by sampling speed data during a period of operation of the disc drive where the speed is stable and only one control operation is performed per revolution of the disc. The sampled speed data is used to generate the compensation values for each of the phases of the spindle motor. The compensation values are stored in a compensation mechanism which is used by the spindle motor speed controller to provide compensation for the asymmetrical phases of the spindle motor.

Having obtained the compensation values, the actual speed output by the spindle motor is measured and is subtracted from a reference speed to generate a difference speed value. In addition, a compensation value is retrieved from a data structure associated with the compensation mechanism based on a phase of the spindle motor. The compensation value is then subtracted from the difference speed value to obtain a compensated difference speed value. A control signal based on this compensated difference speed value is generated and provided to the spindle motor to thereby control the output speed of the spindle motor.

The present invention also can be implemented as a computer-readable program storage device which tangibly embodies a program of instructions executable by a processor to perform a spindle motor speed control method. In addition, the invention also can be implemented as a motor speed controller itself.

These and various other features as well as advantages which characterize the present invention will be apparent upon reading of the following detailed description and review of the associated drawings.

DETAILED DESCRIPTION OF ILLUSTRATIVE EMBODIMENTS

Figure 2:
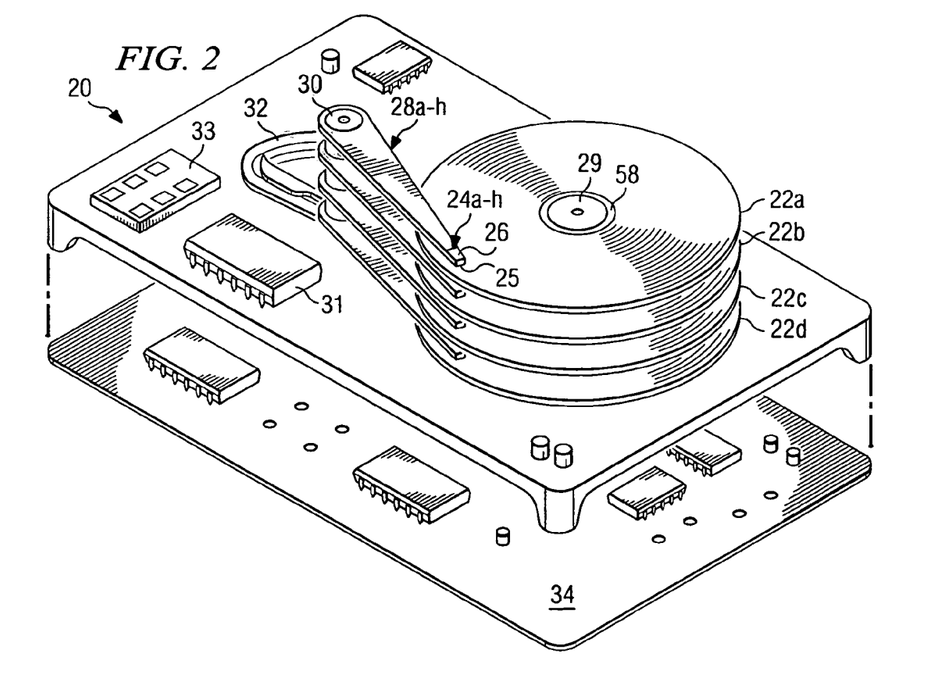
FIG. 2 is an exemplary diagram of a disc drive in accordance with the present invention.

Referring now to the drawings, and initially to FIG. 2, there is illustrated an example of a disc drive designated generally by the reference numeral 20. The disc drive 20 includes a stack of storage discs 22a–d and a stack of read/write heads 24a–h. Each of the storage discs 22a–d is provided with a plurality of data tracks to store user data. As illustrated in FIG. 2, one head is provided for each surface of each of the discs 22a–d such that data can be read from or written to the data tracks of all of the storage discs. The heads are coupled to a pre-amplifier 31. It should be understood that the disc drive 20 is merely representative of a disc drive system utilizing the present invention and that the present invention can be implemented in a disc drive system including more or less storage discs.

The storage discs 22a–d are mounted for rotation by a spindle motor arrangement 29, as is known in the art. Moreover, the read/write heads 24a–h are supported by respective actuator arms 28a–h for controlled positioning over preselected radii of the storage discs 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disc surfaces.

Each of the read/write heads 24a–h is mounted to a respective actuator arm 28a–h by a flexure element (not shown) and comprises a magnetic transducer 25 mounted to a slider 26 having an air bearing surface (not shown), all in a known manner. As typically utilized in disc drive systems, the sliders 26 cause the magnetic transducers 25 of the read/write heads 24a–h to "fly" above the surfaces of the respective storage discs 22a–d for non-contact operation of the disc drive system, as discussed above. When not in use, the voice coil motor 32 rotates the actuator arms 28a–h during a contact stop operation, to position the read/write heads 24a–h over a respective landing zone 58 or 60, where the read/write heads 24a–h come to rest on the storage disc surfaces. As should be understood, each of the read/write heads 24a–h is at rest on a respective landing zone 58 or 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h via the pre-amplifier 31, to control the transfer of data to and from the data tracks of the storage discs 22a–d. The manner for coupling the PCB 34 to the various components of the disc drive is well known in the art, and includes a connector 33 to couple the read/write channel circuitry to the pre-amplifier 31.

Figure 3:
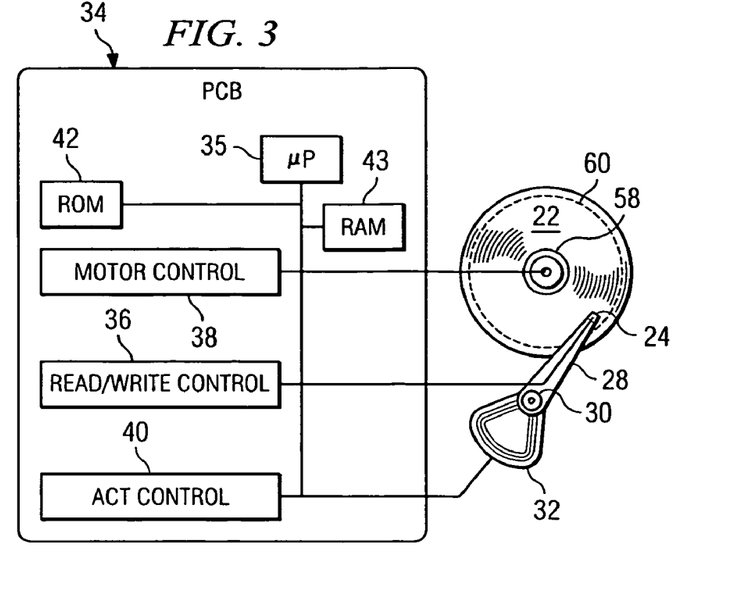
FIG. 3 is an exemplary block diagram of a printed circuit board and its electrical couplings in accordance with the present invention.

Referring now to FIG. 3, there is illustrated in schematic form of the PCB 34 and the electrical couplings between the control electronics on the PCB 34 and the components of the disc drive system described above. A microprocessor 35 is coupled to each of a read/write control 36, spindle motor control 38, actuator control 40, ROM 42 and RAM 43. In modern disc drive designs, the microprocessor can comprise a digital signal processor (DSP). The microprocessor 35 sends data to and receives data from the storage discs 22a–d via the read/write control 36 and the read/write heads 24a–h.

The microprocessor 35 also operates according to instructions stored in the ROM 42 to generate and transmit control signals to each of the spindle motor control 38 and the actuator control 40. The spindle motor control 38 is responsive to the control signals received from the microprocessor 35 to generate and transmit a drive voltage to the spindle motor 29 to cause the storage discs 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage discs 22a–d. The magnitude and polarity of the voltage generated by the actuator control 40, as a function of the microprocessor control signals, determines the radial direction and radial speed of the read/write heads 24a–h.

When data to be written or read from one of the storage discs 22a–d are stored on a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position.

When the actuator has moved the read/write heads 24a–h to the destination data track, a multiplexer (not shown) is used to couple the head 24a–h over the specific data track to be written or read, to the read/write control 36, as is generally known in the art. The read/write control 36 includes a read channel that, in accordance with modern disc drive design, comprises an electronic circuit that detects information represented by magnetic transitions recorded on the disc surface within the radial extent of the selected data track. As described above, each data track is divided into a number of data sectors.

During a read operation, electrical signals transduced by the head from the magnetic transitions of the data sectors are input to the read channel of the read/write control 36 for processing via the pre-amplifier 31. The RAM 43 can be used to buffer data read from or to be written to the data sectors of the storage discs 22a–d via the read/write control 36. The buffered data can be transferred to or from a host computer utilizing the disc drive for data storage.

As previously mentioned, the present invention provides a mechanism for compensating for asymmetrical electrical phases of the spindle motor 29 in the detection of BEMF zero crossings and control of the velocity generated by the spindle motor 29. BEMF zero crossings are generated from the servo application specific integrated circuit (ASIC) of the spindle motor based on the voltage relationship between the phase voltage (Vphase) and a centertap voltage (Vcentertap). The number of zero-crossings per mechanical revolution depends on the number of magnetic poles in the rotor of the spindle motor. For example, with a 12-pole motor, there are 12 original BEMF zero crossings, however some servo ASICs detect only the rising edges of the original BEMF zero-crossings and generate 6 zero-crossing pulses per mechanical revolution. The detection of BEMF zero crossings in motor control is generally known in the art.

There are a number of factors that may affect the quality of detection of the BEMF zero crossings. One common factor that negatively affects the quality of detection of the BEMF zero crossings is that the motor may experience asymmetrical electrical phases. This factor causes uneven timings between BEMF zero crossings even though the speed may be constant.

Figure 4:
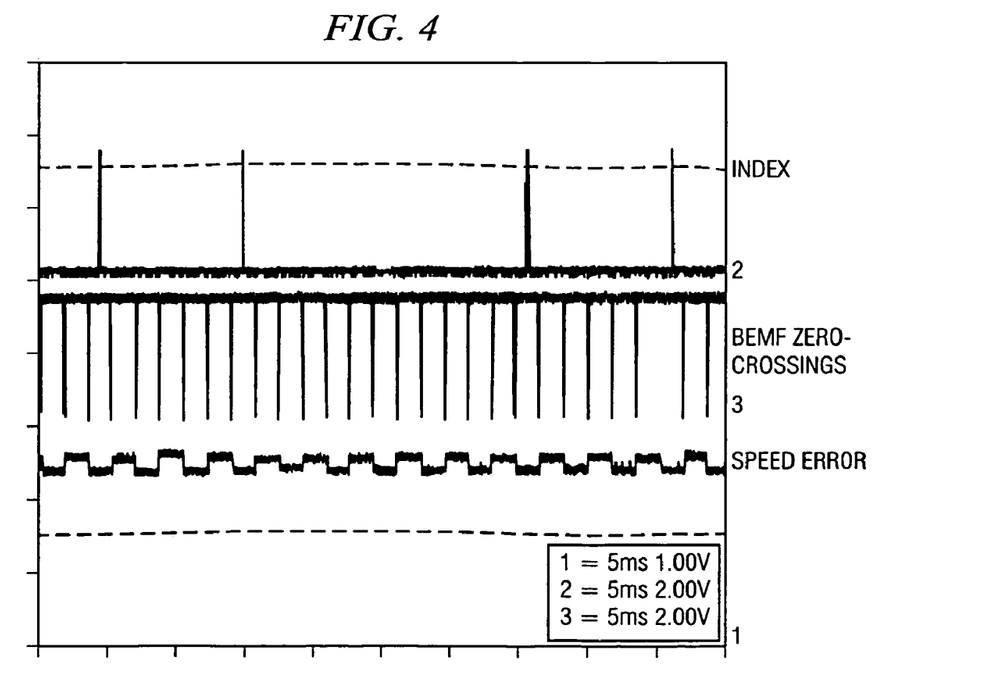
FIG. 4 is an exemplary diagram that illustrates the problem generated by asymmetrical electrical phases of the spindle motor.

FIG. 4 illustrates the problem generated by asymmetrical electrical phases of the spindle motor. As shown in FIG. 4, the index signal indicates one mechanical revolution. The speed error signal shows the timing between two zero-crossings. The spindle motor used to generate the waveforms in FIG. 4 is a 12-pole motor and the servo ASIC generates 6 zero-crossings per mechanical revolution. The control action, in the depicted example, is updated at every zero crossing. As shown in FIG. 4, the speed error waveform is oscillatory and thus, the disc is spinning faster in some sections and slower in others. While the time for one mechanical revolution may be quite stable, the timing and speed of the disc is quite different from one sector to another within that one mechanical revolution. Such behavior may significantly impact on the bit error rate (BER) during read and write operations of the disc drive.

The present invention solves the problems associated with the oscillatory nature of the speed of the disc from sector to sector by providing a compensation mechanism that adds a certain compensation value for every electrical phase of the spindle motor. In this way, the present invention achieves a zero repeatable error. The compensation values that are added are learned from several samples of the speed errors.

The compensation values are learned under two conditions, stable speed and one control per revolution. That is, speed values are not obtained during a spin-up control mode of the spindle motor control when the disc is being accelerated to a stable speed. A time is established from the beginning of the spin-up control mode, at which control is passed from the spin-up control mode to a one control per revolution control mode (or 1× control mode). The 1× control mode is a control mode in which only one control signal/calculation is made per one mechanical revolution of the disc. Therefore, if in one mechanical revolution there are 12 zero-crossings, one control action is made every 12 zero-crossings. It is during this control mode operation that samples are taken when the speed of the disc achieves a stable speed. At some time later, control is passed from the 1× control mode to a BEMF closed-loop control mode which makes use of the learned values obtained from the 1× control mode at the stable speed to thereby add compensation values to achieve a zero repeatable error.

The learning algorithm of the present invention involves obtaining a matrix of speed samples during the stable speed region of the 1× control mode. The average speed of all the samples is obtained. Thereafter, the average speed of every phase from all samples is constructed as a row matrix. This row matrix of average speed of every phase from all samples is normalized and a reference speed is subtracted from the elements of the row matrix, thereby generating a compensation matrix containing a compensation value for every phase. This compensation matrix is utilized by the control circuit of the present invention to add a compensation value to the measured speed to thereby generate a control signal to control the speed of the disc generated by the spindle motor.

Figure 5:
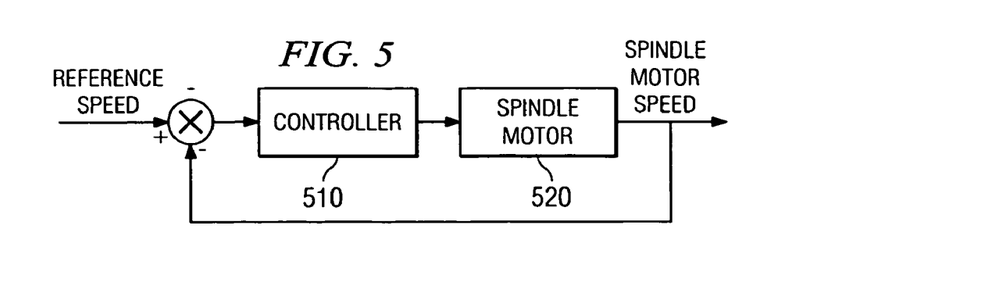
FIG. 5 is an exemplary diagram of a typical speed controller for a spindle motor.

FIG. 5 is an exemplary diagram of a typical speed controller for a spindle motor. As shown in FIG. 5, the speed controller is normally a proportional integral (PI) controller which amplifies the speed error between the reference speed and the actual speed. The output of the controller may be a voltage (for voltage controlled loop) or a current (for current controlled loop) to drive the motor. The system is a digital control loop where the sampling time is determined by the BEMF zero crossing's frequency.

Thus, for example, with the depicted speed controller, a motor output signal, as determined for example, by a measurement device (not shown) associated with the spindle motor, is subtracted from a reference speed signal and is passed into the controller 510. The controller 510 generates a control signal by amplifying the speed error between the reference speed signal and the motor output speed signal and applies the control signal to the spindle motor 520. In response, the spindle motor 520 produces an output speed which is measured and provided back to the controller 510 in order to provide a control loop for controlling the speed output of the spindle motor 520.

Figure 6:
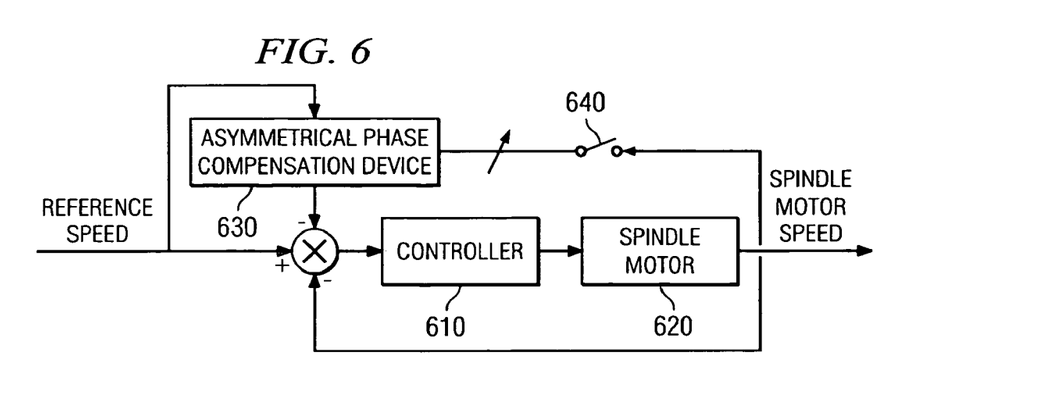
FIG. 6 is an exemplary block diagram of a compensation BEMF controller configuration in accordance with the present invention.

FIG. 6 is an exemplary block diagram of a compensation BEMF controller configuration in accordance with the present invention. As shown in FIG. 6, in order to remove the repeatable error component due to the asymmetrical phases of the spindle motor 620, a compensation mechanism 630 is provided in the control loop for adding a compensation signal to the combination of the reference speed signal and measured output speed signal of the spindle motor 620 for every phase of the spindle motor 620. The particular phase of the motor may be determined, for example, using a counter (not shown) which synchronizes with the electrical phase of the motor. The counter may be a hardware or software counter. The value of the counter may be used to determine which phase the motor is in and thereby, determine which compensation value is to be used to compensate for asymmetrical phases of the motor.

Thus, the input to the controller 610 is the reference speed signal minus the actual motor speed signal and minus the compensation signal. The controller 610 generates a control signal based on this input signal and applies the control signal to the spindle motor 620. The spindle motor 620 then generates an output speed signal that is fed back to the controller 610 to thereby provide a control loop for controlling the speed of the spindle motor 620.

As shown in FIG. 6, during a learning operation of the BEMF controller of the present invention, the switch 640 is in an enabled state. With the switch 640 in the enabled state, the reference speed signal and the actual speed output signal are provided to the compensation mechanism 630. The compensation mechanism 630 will determine the error between the reference speed signal and the actual speed output signal for each phase of operation of the spindle motor and construct a matrix of compensation values based on these errors that will be used during normal operation. This is performed for each phase of the motor and may be performed for multiple mechanical revolutions, as discussed in more detail hereafter.

The learning of compensation values, in accordance with the present invention, is performed by sampling speed values during an operation of the spindle motor where a stable speed is established and only one control per revolution is performed. A stable speed is used so that the samples are not noisy. The one control per revolution is used to guarantee unbiased samples.

Figure 7:
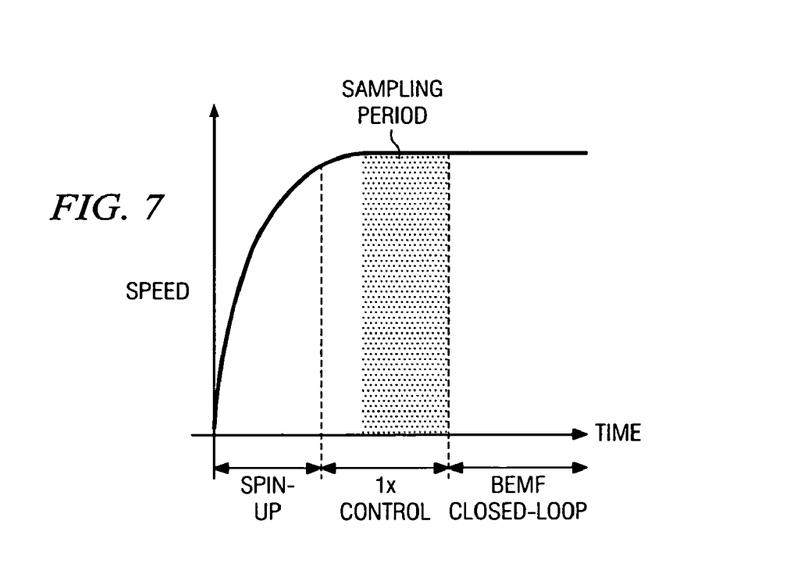
FIG. 7 is an exemplary diagram that illustrates the timing plan for sampling speed values in accordance with the present invention.

FIG. 7 illustrates the timing plan for sampling speed values in accordance with the present invention. As shown in FIG. 7, an open or closed speed ramp is used to bring the speed of the spindle motor to the reference speed before a one control per revolution controller stabilizes the speed. Samples of speed values are obtained during a period after the one control per revolution controller begins to operate in which the speed is stabilized. These samples of speed values are taken before the system switches to the BEMF closed loop control according to the present invention. These sampled speed values are used to generate a matrix of speed values that is used to determine compensation values for use by the compensation mechanism 630 in the closed loop controller arrangement of FIG. 6.

In order to generate the compensation values for use with the compensation mechanism of FIG. 6, first a matrix of the sampled speed values is generated. The sampled speed values matrix T has N×P elements where N is the number of revolutions and P is the number of electrical phases in the spindle motor. Thus, for example, for one revolution of the 12-pole spindle motor of the example implementation discussed above, the matrix T will be a 1×12 matrix.

The average speed of the sampled speed values is calculated by averaging all the elements of the T matrix:

$$S = \text{avg}(T_{p,n}) \text{ where } p=1 \text{ to } P; n=1 \text{ to } N \quad (1)$$

The average speed of every phase from all samples can be constructed as a row matrix A:

$$A = \{a_1 \ldots a_P\}, \quad a_p = \frac{\sum_{n=1}^{N} T_{p,n}}{N} \quad (2)$$

The objective of the present invention is to obtain a matrix C of compensation values that may be used to compensate for the asymmetric phases of the spindle motor. The elements of this compensation matrix for each revolution should be zero in order to avoid a permanent offset. Thus, the objective of the present invention is to obtain:

$$C = \{c_1 \ldots c_p\} \text{ where } \sum_{p=1}^{P} c_p = 0 \quad (3)$$

To satisfy the constraint that the total of the compensation values for each mechanical revolution of the spindle motor be zero, a normalization technique is utilized by the present invention. With this normalization technique, the elements of matrix Z are scaled proportionally to the reference speed $T_{ref}$ as follows:

$$N(A) = \{N(a_1) \ldots N(a_p)\}, \quad N(a_p) = (T_{ref} * a_p)/s \quad (4)$$

Having normalized the matrix A, the compensation matrix may be calculated by subtracting the reference speed from the normalized matrix A:

$$C = \{c_1 \ldots c_p\}, \quad c_p = N(a_p) - T_{ref} \quad (5)$$

Thus, the compensation values for the phases of the spindle motor are the value obtained from subtracting a reference speed from a normalized average speed error for the phase as determined from the sampled speed values.

The resulting compensation values are stored in a data structure storage device (not shown), such as in a memory, associated with the compensation mechanism 630. These compensation values are retrievable from the data structure based on a current phase of the spindle motor as determined, for example, by a counter (not shown) used to keep track of the phases of the spindle motor 620. When the compensation value is subtracted from the reference speed and the actual speed output by the spindle motor 620 is also subtracted from the reference speed, the resulting signal will cause the controller 610 to output a control signal to the spindle motor 620 that would maintain approximately a zero repetitive error.

Thus, the present invention augments the standard spindle motor controller by providing a compensation mechanism that learns compensation values from an operation of the spindle motor and then applies these compensations values to the reference and actual speed signals to thereby obtain a compensated input to the controller 610. Based on this compensated input, the controller 610 generates a control signal for controlling the operation of the spindle motor that will provide a more uniform operation of the spindle motor through all electrical phases of the spindle motor.

Figure 8:
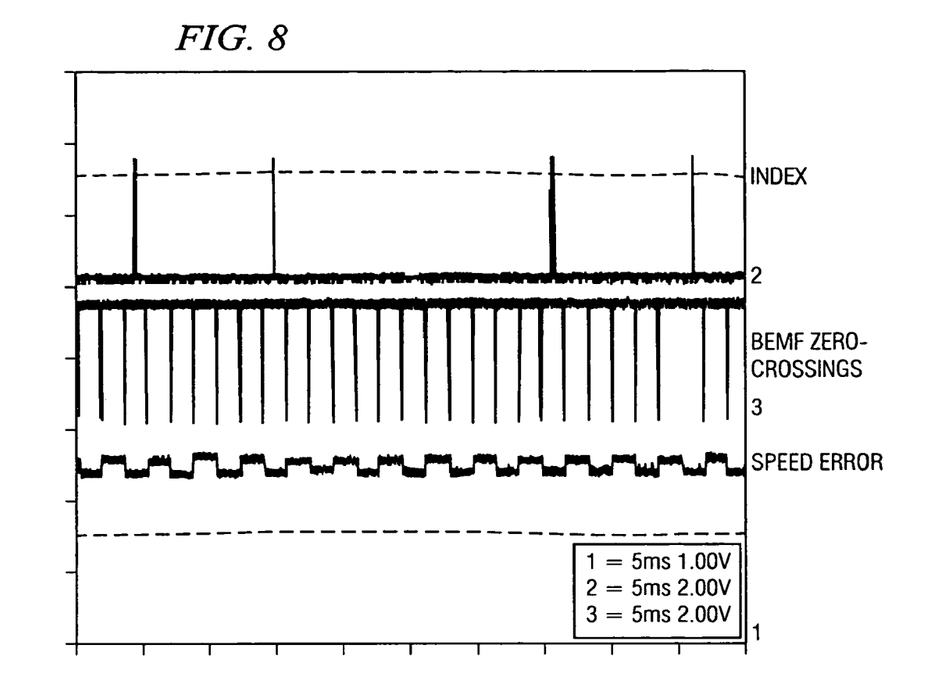
FIG. 8 is an exemplary diagram that illustrates an exemplary speed error waveform obtained using a conventional spindle motor speed controller, such as that shown in FIG. 5.
Figure 9:
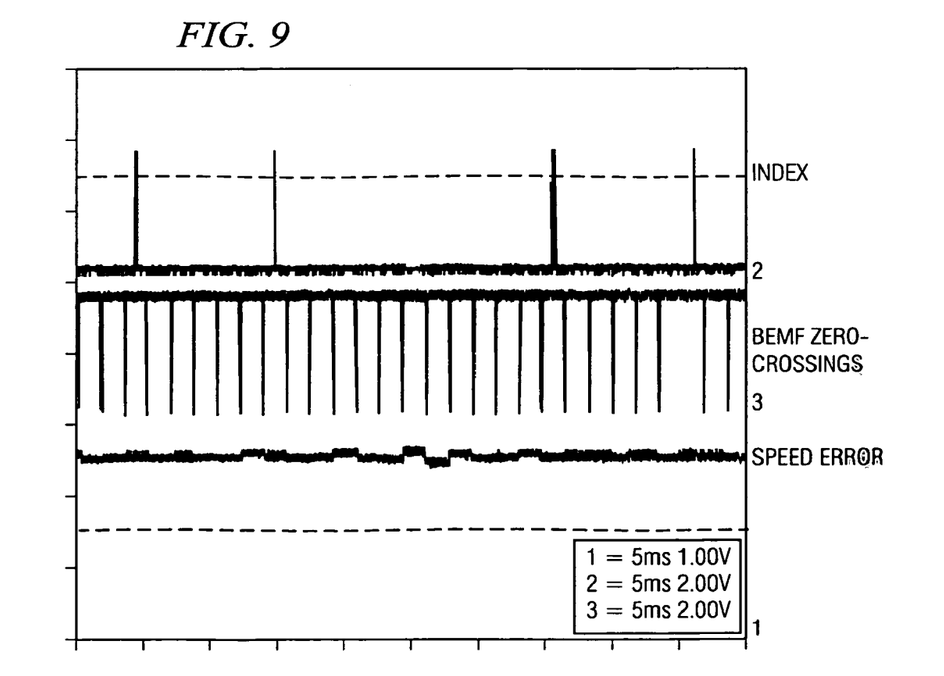
FIG. 9 is an exemplary diagram that illustrates an exemplary speed error waveform obtained using a spindle motor speed controller having asymmetrical phase compensation according to the present invention, such as shown in FIG. 6.

FIGS. 8 and 9 illustrate exemplary speed error waveforms obtained using a spindle motor speed controller in which compensation is not applied and a spindle motor speed controller having asymmetrical phase compensation according to the present invention, respectively. As shown in FIG. 8, the speed error waveform is oscillatory with the conventional spindle motor speed controller. As previously mentioned, this is an indication that the speed is fluctuating between being too fast for some sectors and too slow for other sectors and this may cause problems with regard to the bit error rate. As shown in FIG. 9, with asymmetrical phase compensation according to the present invention, the spindle motor speed controller results in a non-oscillatory waveform indicating that a zero speed error is achieved. Thus, the present invention eliminates the problems of asymmetrical phases in the spindle motor.

Figure 10:
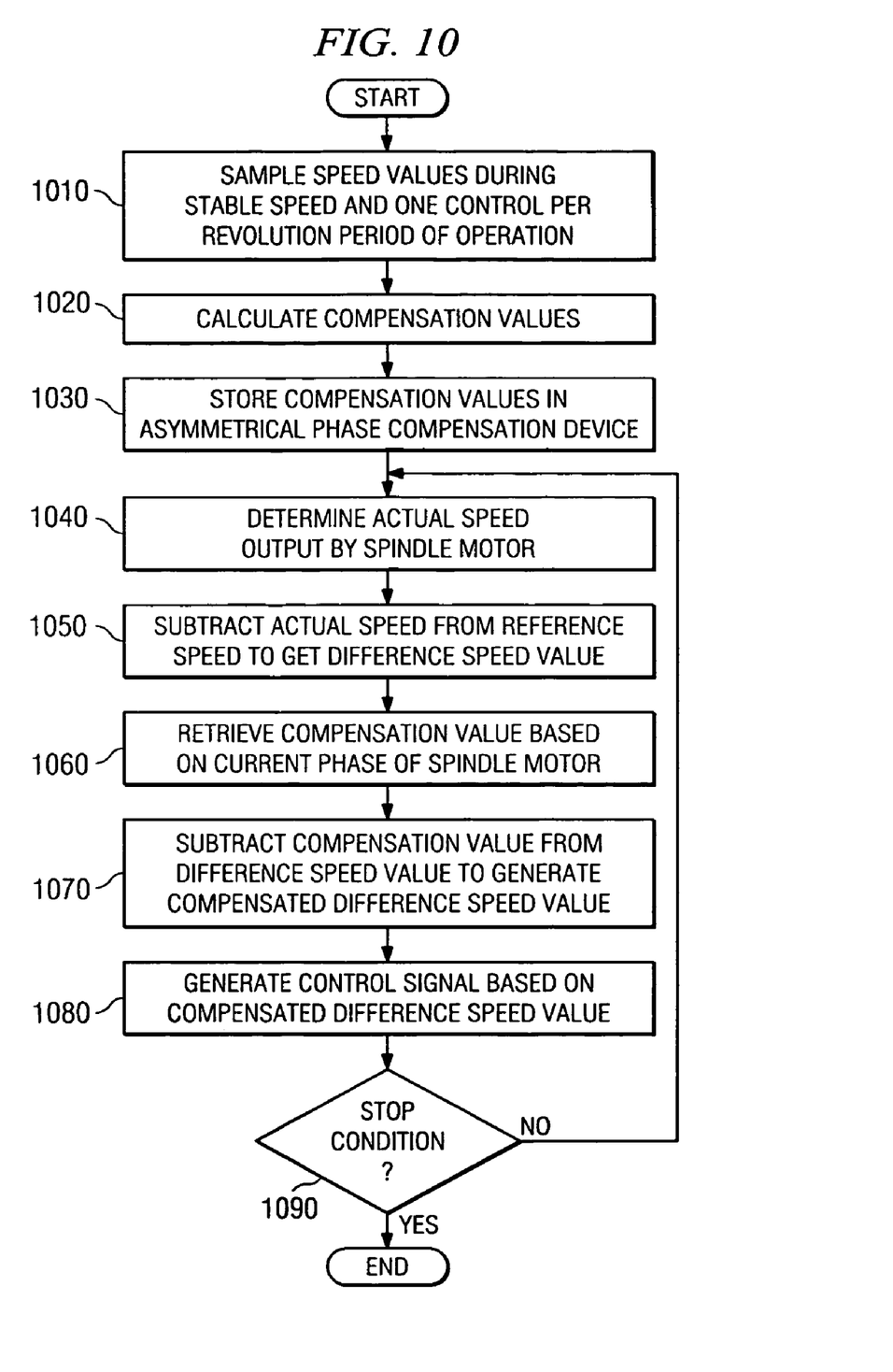
FIG. 10 is a flowchart outlining an exemplary operation of the present invention when performing spindle motor speed control.

FIG. 10 is a flowchart that illustrates an exemplary spindle motor speed control operation according to the invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 10, the operation starts by sampling speed values during a period of operation in which the speed of the spindle motor is kept stable and there is only one control per revolution of the disc (step 1010). From these sample values, the compensation values to be applied to speed signals for various phases of the spindle motor are calculated (step 1020). These compensation values are then stored in a compensation value data structure within a compensation mechanism of the spindle motor speed controller (step 1030). Thereafter, the actual speed output by the spindle motor is measured (step 1040) and is subtracted from a reference speed to generate a difference speed value (step 1050). In addition, a compensation value is retrieved from a compensation value data structure based on the current phase of the spindle motor (step 1060). The compensation value is then subtracted from the difference speed value to obtain a compensated difference speed value (step 1070). A control signal based on this compensated difference speed value is generated and provided to the spindle motor to thereby control the output speed of the spindle motor (step 1080). A determination is made as to whether a stop condition has occurred, such as turning off of the disc drive or stopping of the spinning of the disc (step 1090). If so, the operation terminates; otherwise, the operation returns to step 1040 and steps 1040–1090 are repeated.

Thus, the present invention provides a method, apparatus and computer program product for controlling spindle motor speed in a disc drive. In an exemplary embodiment of the present invention, the speed of the spindle motor is determined, a compensation value is then identified based on a phase of the spindle motor, a control signal is then generated based on the speed of the spindle motor, the compensation value and a reference speed, and the control signal is then provided to the spindle motor to thereby control the speed of the spindle motor. The speed of the spindle motor may be determined, for example, using a Back Electromotive Force (BEMF) zero-crossings methodology for determining speed. The control signal may be generated, for example, by subtracting the speed of the spindle motor from the reference speed to generate a difference speed value and then subtracting the compensation value from the difference speed value to generate a compensated difference speed value. In addition, a matrix of compensation values may be generated based on sampled spindle motor speed data such that the matrix of compensation values includes a compensation value for each phase of the spindle motor. The spindle motor speed data may be sampled, for example, for a period of time of operation of the spindle motor where the spindle motor speed is stable and only one control operation is performed per revolution of the spindle motor. From this spindle motor speed data, average speed values may be calculated for each phase of the spindle motor and the matrix of compensation values may be generated as a difference between normalized average speed values and a reference speed for each phase of the spindle motor.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disc, a hard disc drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising the steps of:
    determining a speed of a motor;
    determining a compensation value based on a phase of the motor, wherein the compensation value is a value that compensates for asymmetry between electrical phases of the motor;
    generating a control signal based on the speed of the motor, the compensation value and a reference speed; and
    providing the control signal to the motor to thereby control the speed of the motor.

2. The method of claim 1, wherein the speed of the motor is determined using a Back Electromotive Force (BEMF) zero-crossings methodology for determining speed.

3. The method of claim 1, wherein generating a control signal includes:
    subtracting the speed of the motor from the reference speed to generate a difference speed value;
    subtracting the compensation value from the difference speed value to generate a compensated difference speed value; and
    generating the control signal based on the compensated difference speed value.

4. The method of claim 1, further comprising:
    generating a matrix of compensation values based on sampled motor speed data, wherein the matrix of compensation values includes a compensation value for each phase of the motor.

5. The method of claim 4, wherein generating the matrix of compensation values includes:
    sampling motor speed data for a period of time of operation of the motor where the motor speed is stable and only one control operation is performed per revolution of the motor;
    calculating average speed error values for each phase of the motor; and
    generating the matrix of compensation values as a difference between normalized average speed error values and a reference speed for each phase of the motor.

6. The method of claim 5, wherein the sampled motor speed data is stored in a matrix T having N×P elements, where N is a number of revolutions of the motor and P is a number of electrical phases in the motor, and wherein the average speed error values is a matrix A are calculated using the following equation:

$$A = \{a_1 \ldots a_P\}, \quad a_p = \frac{\sum_{n=1}^{N} T_{p,n}}{N}$$

where $a_p$ is the average speed error value for phase p.

7. The method of claim 6, wherein the normalized average speed error values are determined using the following equation:

$$N(A) = \{N(a_1) \ldots N(a_p)\}, \; N(a_p) = (T_{ref} * a_p)/s$$

where N(A) is the normalized matrix of average speed error values, $N(a_p)$ is the normalized average speed error value for phase p, $T_{ref}$ is a reference speed, and s is the average speed of all sampled speed data.

8. The method of claim 7, wherein the matrix of compensation values is generated using the following equation:

$$C = \{c_1 \ldots c_p\}, \; c_p = N(a_p) - T_{ref}$$

where C is the matrix of compensation values and $c_p$ is the compensation value for phase p.

9. The method of claim 1, wherein the compensation value is determined by retrieving the compensation value from a data structure having compensation values for each phase of the motor, and wherein the compensation values for each phase of the motor are learned from sampling motor speed data for a period of time of operation of the motor where the motor speed is stable and only one control operation is performed per revolution of the motor.

10. The method of claim 1, wherein the motor is a spindle motor.

11. An apparatus comprising:
a motor
a measuring device for measuring a speed of the motor;
a controller coupled to the motor; and
an asymmetrical phase compensation device coupled to the controller, wherein the asymmetrical phase compensation device determines a compensation value based on a phase of the motor, the compensation value being a value that compensates for asymmetry between electrical phases of the motor, and the controller generates a control signal based on the speed of the motor, the compensation value and a reference speed and provides the control signal to the motor to thereby control the speed of the motor.

12. The apparatus of claim 11, wherein the speed of the motor is determined using a Back Electromotive Force (BEMF) zero-crossings methodology for determining speed.

13. The apparatus of claim 11, wherein the controller generates the control signal by subtracting the speed of the motor from the reference speed to generate a difference speed value, and subtracting the compensation value from the difference speed value to generate a compensated difference speed value.

14. The apparatus of claim 11, wherein the asymmetrical phase compensation device generates a matrix of compensation values based on sampled motor speed data, and wherein the matrix of compensation values includes a compensation value for each phase of the motor.

15. The apparatus of claim 14, wherein the asymmetrical phase compensation device samples motor speed data for a period of time of operation of the motor where the motor speed is stable and only one control operation is performed per revolution of the motor, and wherein the asymmetrical phase compensation device calculates average speed error values for each phase of the motor and generates the matrix of compensation values as a difference between normalized average speed error values and a reference speed for each phase of the motor.

16. The apparatus of claim 15, wherein the sampled motor speed data is stored in a matrix T having N×P elements, where N is a number of revolutions of the motor and P is a number of electrical phases in the motor, and wherein the average speed error values is a matrix A are calculated using the following equation:

$$A = \{a_1 \ldots a_P\}, \quad a_p = \frac{\sum_{n=1}^{N} T_{p,n}}{N}$$

where $a_p$ is the average speed error value for phase p.

17. The apparatus of claim 16, wherein the normalized average speed error values are determined using the following equation:

$$N(A)=\{N(a_1) \ldots N(a_p)\}, N(a_p)=(T_{ref}*a_p)/s$$

where N(A) is the normalized matrix of average speed error values, $N(a_p)$ is the normalized average speed error value for phase p, $T_{ref}$ is a reference speed, and s is the average speed of all sampled speed data.

18. The apparatus of claim 17, wherein the matrix of compensation values is generated using the following equation:

$$C=\{c_1 \ldots c_p\}, c_p=N(a_p)-T_{ref}$$

where C is the matrix of compensation values and $c_p$ is the compensation value for phase p.

19. The apparatus of claim 11, wherein the compensation value is determined by retrieving the compensation value from a data structure having compensation values for each phase of the motor, and wherein the compensation values for each phase of the motor are learned from sampling motor speed data for a period of time of operation of the motor where the motor speed is stable and only one control operation is performed per revolution of the motor.

20. The apparatus of claim 11, wherein the motor is a spindle motor.

* * * * *